(12) United States Patent
Maeda (10) Patent No.: US 8,469,520 B2
(45) Date of Patent: Jun. 25, 2013

(54) LIGHT SOURCE DEVICE AND PROJECTION DISPLAY APPARATUS

(75) Inventor: Makoto Maeda, Nara (JP)

(73) Assignee: Sanyo Electric., Ltd., Moriguchi-Shi (JP)

( * ) Notice: Subject to any disclaimer, the term of this patent is extended or adjusted under 35 U.S.C. 154(b) by 107 days.

(21) Appl. No.: 13/118,965

(22) Filed: May 31, 2011

(65) Prior Publication Data

US 2011/0310353 A1   Dec. 22, 2011

(30) Foreign Application Priority Data

May 31, 2010  (JP) .................. 2010-124029

(51) Int. Cl.
   *G03B 21/00* (2006.01)

(52) U.S. Cl.
   USPC ................... 353/31; 353/30; 353/38; 353/84; 353/94; 353/98; 349/9

(58) Field of Classification Search
   USPC ................ 353/20, 30, 31, 38, 84, 85, 94, 98, 353/122; 349/5, 7–9, 108–109; 348/744–747; 362/84, 231, 294, 373
   See application file for complete search history.

(56) References Cited

U.S. PATENT DOCUMENTS

| | | | |
|---|---|---|---|
| 5,345,322 A * | 9/1994 | Fergason | 349/79 |
| 6,390,626 B2 * | 5/2002 | Knox | 353/20 |
| 6,648,475 B1 * | 11/2003 | Roddy et al. | 353/31 |
| 6,746,122 B2 * | 6/2004 | Knox | 353/20 |
| 6,851,811 B2 * | 2/2005 | Akiyama | 353/31 |
| 7,048,385 B2 * | 5/2006 | Beeson et al. | 353/97 |
| 7,547,114 B2 * | 6/2009 | Li et al. | 362/231 |
| 7,607,784 B2 * | 10/2009 | Shimaoka et al. | 353/85 |
| 2004/0036668 A1 * | 2/2004 | Nakanishi | 345/88 |
| 2005/0231692 A1 * | 10/2005 | Sun et al. | 353/84 |
| 2006/0203209 A1 * | 9/2006 | De Vaan | 353/84 |
| 2007/0019408 A1 * | 1/2007 | McGuire et al. | 362/231 |
| 2009/0115713 A1 * | 5/2009 | Kakinuma et al. | 345/88 |
| 2010/0238412 A1 * | 9/2010 | Kurosaki | 353/31 |

* cited by examiner

*Primary Examiner* — Georgia Y Epps
*Assistant Examiner* — Sultan Chowdhury
(74) *Attorney, Agent, or Firm* — Marvin A. Motsenbocker; Mots Law, PLLC (57) ABSTRACT

A light source device includes: a reference light source that emits reference color component light of a plurality of colors; an excitation light source that emits excitation light for supplemental color component light; a luminous body member including a luminous body that emits the supplemental color component light in response to the excitation light; and a combining unit that combines the reference color component light of the plurality colors and the supplemental color component light in such a way as to superimpose the supplemental color component light on light paths of the reference color component light of the plurality of colors.

7 Claims, 9 Drawing Sheets

LIGHT SOURCE DEVICE AND PROJECTION DISPLAY APPARATUS

CROSS REFERENCE TO RELATED APPLICATIONS

This application is based upon and claims the benefit of priority from prior Japanese Patent Application No. 2010-124029, filed on May 31, 2010; the entire contents of which are incorporated herein by reference.

BACKGROUND OF THE INVENTION

1. Field of the Invention

The present invention relates to a light source device and a projection display apparatus that include a reference light source emitting reference color component light of multiple colors.

2. Description of the Related Art

A projection display apparatus has been known that includes a light source, an imager configured to modulate light emitted from the light source, and a projection unit configured to project light emitted from the imager onto a projection surface.

A projection display apparatus has been proposed that utilizes supplemental color component light (e.g., yellow component light, cyan component light, and orange component light) in addition to reference color component light of multiple colors (e.g., red component light, green component light, and blue component light) with the aim of improving color reproduction range (Japanese Patent Application Publication No. 2005-301063, for example)

However, the supplemental color component light is not selectively superimposed on the reference color component light of the multiple colors but is superimposed on the reference color component light in a time-division manner. Specifically, the supplemental color component light is superimposed on the reference color component light in a time-division manner in a single frame. Thus, the color reproduction range cannot be appropriately improved. For example, color purity may degrade in some images.

SUMMARY OF THE INVENTION

A light source device according to a first aspect includes: a reference light source (reference light source 10) that emits reference color component light of a plurality of colors; an excitation light source (excitation light source 20) that emits excitation light for supplemental color component light; a luminous body member (reflection type wheel 40 or transmission-type wheel 140) including a luminous body that emits the supplemental color component light in response to the excitation light; and a combining unit (second band-pass filter 50) that combines the reference color component light of the plurality colors and the supplemental color component light in such a way as to superimpose the supplemental color component light on light paths of the reference color component light of the plurality of colors.

In the first aspect, the reference color light source sequentially emits the reference color component light of the plurality of colors respectively in a plurality of segments forming a single frame. The excitation light source emits the excitation light in a target segment that is at least one of the plurality of segments. The supplemental color component light is superimposed on any one of the reference color component light of the plurality of colors in the target segment.

In the first aspect, the luminous body is a reflection-type wheel.

In the first aspect, the combining unit is a band-pass filter that reflects the reference color component light of the plurality of colors and transmits the supplemental color component light.

A projection display apparatus according to a second aspect, includes: a reference light source that emits reference color component light of a plurality of colors; an excitation light source that emits excitation light for supplemental color component light; a luminous body member including a luminous body that emits the supplemental color component light in response to the excitation light; a combining unit that combines the reference color component light of the plurality colors and the supplemental color component light in such a way as to superimpose the supplemental color component light on light paths of the reference color component light of the plurality of colors; and an imager that modulates light emitted from the combining unit.

DETAILED DESCRIPTION OF THE EMBODIMENTS

A light source device and a projection display apparatus according to an embodiment of the present invention are described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Overview of Embodiment

Firstly, the light source device according to the embodiment includes: a reference light source configured to emit reference color component light of multiple colors; an excitation light source configured to emit excitation light for supplemental color component light; a luminous body member having light emitting bodies configured to emit the supplemental color component light in response to the excitation light; and a combining unit configured to combine the reference color component light of the multiple colors and the supplemental color component light in such a way as to superimpose the supplemental color component light on the light path of the reference color component light of the multiple colors.

Secondly, the projection display apparatus according to the embodiment includes: a reference light source configured to emit reference color component light of multiple colors; an excitation light source configured to emit excitation light for supplemental color component light; a luminous body member having light emitting bodies configured to emit the supplemental color component light in response to the excitation light; a combining unit configured to combine the reference color component light of the multiple colors and the supplemental color component light in such a way as to superimpose the supplemental color component light on the light path of the reference color component light of the multiple colors; and an imager configured to modulate light emitted from the combining unit.

In the embodiment, the combining unit combines the reference color component light of the multiple colors and the supplemental color component light in such a way as to superimpose the supplemental color component light on the light path of the reference color component light of the multiple colors. The supplemental color component light is emitted from the luminous body in response to the excitation light emitted from the excitation light source.

Thus, the supplemental color component light can be selectively superimposed on the reference color component light of the multiple colors, whereby the color reproduction range can be appropriately improved.

First Embodiment (Projection Display Apparatus)

Figure 1:
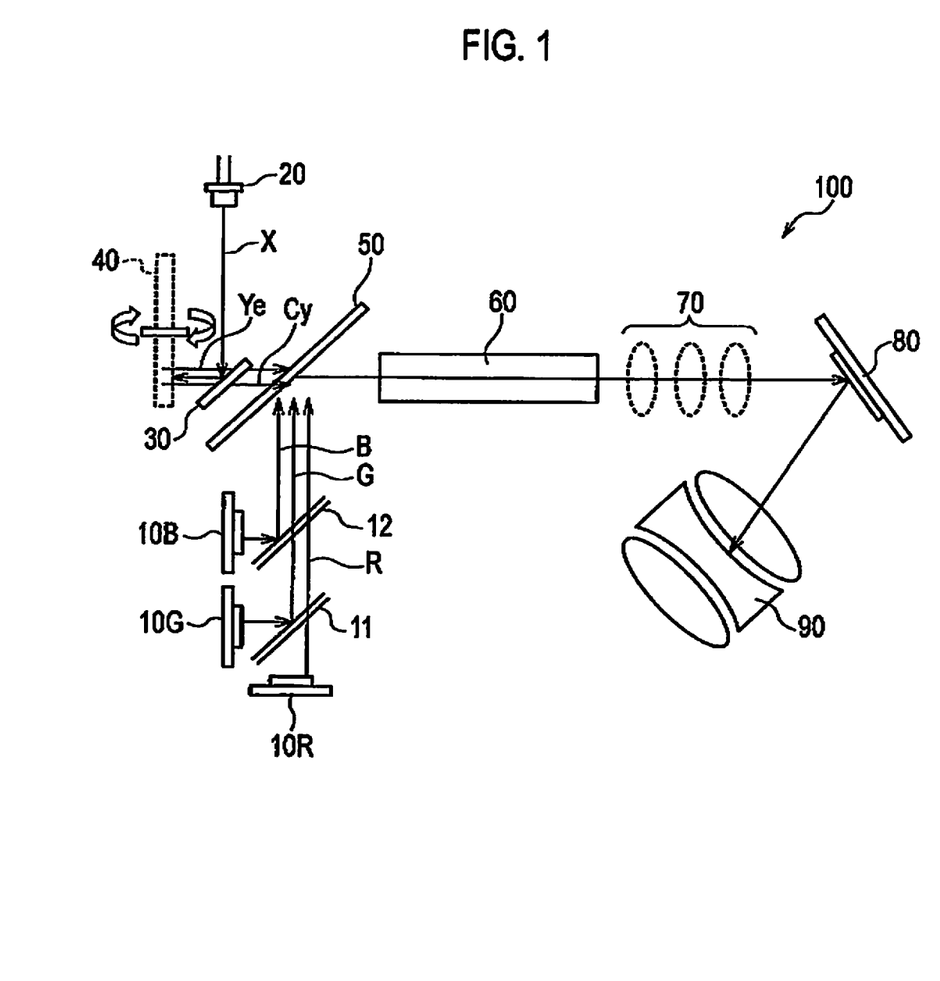
FIG. 1 is a diagram of a projection display apparatus 100 according to a first embodiment.

A projection display apparatus according to a first embodiment is described below with reference to the drawings. FIG. 1 is a diagram of the projection display apparatus 100 according to the first embodiment. In the first embodiment, the projection display apparatus 100 including a digital micromirror device (DMD) as an imager is exemplarily described.

As shown in FIG. 1, the projection display apparatus 100 includes reference light sources 10, an excitation light source 20, a first band-pass filter 30, a reflection-type wheel 40, a second band-pass filter 50, a rod integrator 60, a lens group 70, a DMD 80, and a projection unit 90.

The reference light sources 10 emit reference color component light. Red component light R, green component light G, and blue component light B are the reference color component light. The reference light sources 10 include a light source 10R, a light source 10G, and a light source 10B.

The light source 10R, which emits the red component light R, is a red light emitting diode (LED) or a red laser diode (LD) for example. The red component light R emitted from the light source 10R passes through a dichroic mirror 11 and a dichroic mirror 12.

The light source 10G, which emits the green component light G, is a green LED or a green LD for example. The green component light G emitted from the light source 10G is reflected by the dichroic mirror 11 and passes through the dichroic mirror 12.

The light source 10B, which emits the blue component light B, is a blue LED or a blue LD for example. The blue component light B emitted from the light source 10B is reflected by the dichroic mirror 12.

The excitation light source 20 emits excitation light X for the supplemental color component light. The excitation light X is short-wavelength light such as ultraviolet light, for example. The excitation light source 20 is a short-wavelength LD, for example. The supplemental color light component light is yellow component light Ye, cyan component light Cy, and the like.

The first band-pass filter 30 is configured to reflect the excitation light X and transmit the supplemental color light component light. Specifically, the first band-pass filter 30 is configured to reflect the excitation light X emitted from the excitation light source 20 toward the reflection-type wheel 40, and transmit the supplemental color component light emitted from the reflection-type wheel 40 toward the second band-pass filter 50.

Figure 2:
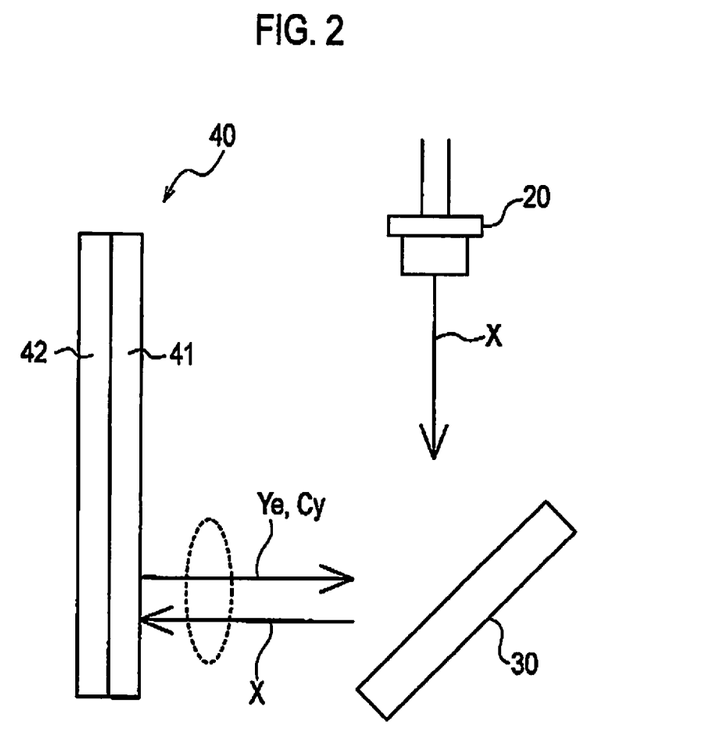
FIG. 2 is a diagram of a reflection type wheel 40 according to the first embodiment.

The reflection-type wheel 40 rotates about a rotation axis. Specifically, the reflection-type wheel 40 includes a luminous body layer 41 and a reflective film 42 as shown in FIG. 2.

Figure 3:
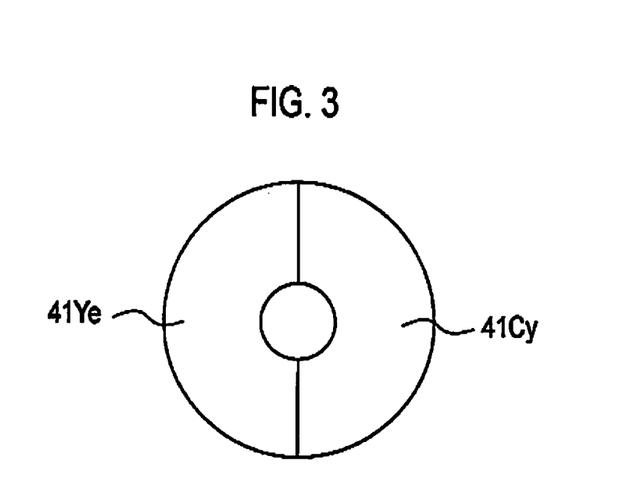
FIG. 3 is a diagram of the reflection type wheel 40 according to the first embodiment.

The luminous body layer 41 includes light emitting bodies configured to emit the supplemental color component light in response to the excitation light X. A fluorescent body, a phosphor, and the like are the light emitting bodies. As shown in FIG. 3 for example, the luminous body layer 41 includes a luminous body region 41Ye including a luminous body configured to emit the yellow component light Ye in response to the excitation light X, and a luminous body region 41Cy including a luminous body configured to emit the cyan component light Cy in response to the excitation light X. The luminous body region 41Cy and the luminous body region 41Ye both have a substantially semicircular shape. It should be noted that, in FIG. 3, the light incident surface of the luminous body layer 41 is shown.

Referring back to FIG. 2, the reflection film 42 reflects the supplemental color component light. It should be noted that the reflection film 42 is configured to reflect the excitation light X as well as the supplemental color component light. In this case, it should be noted that the light emitting bodies provided on the light emitting layer 41 emit the supplemental color component light in response to the excitation light reflected by the reflection film 42.

To reduce the optical feed back to the excitation light source 20, the reflection film 42 preferably inclines slightly with respect to the traveling direction of the excitation light X.

Referring back to FIG. 1, the second band-pass filter 50 is configured to reflect the reference color component light and transmit the supplemental color component light. Specifically, the second band-pass filter 50 is configured to reflect the reference color component light emitted from the reference light source 10 toward the rod integrator 60 and transmit the supplemental color component light reflected by the reflection type wheel 40 toward the rod integrator 60.

Figure 4:
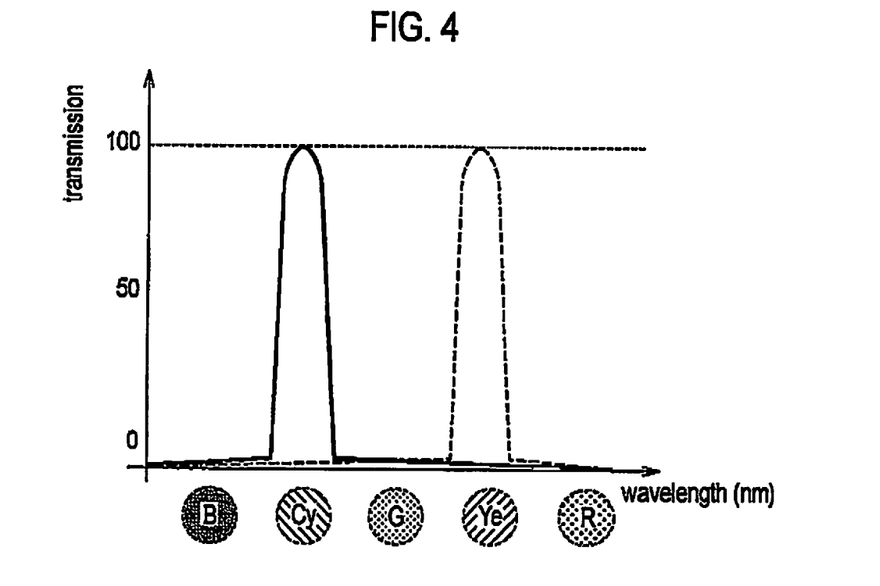
FIG. 4 is a diagram of a second band-pass filer 50 according to the first embodiment.

As shown in FIG. 4 for example, the second band-pass filter 50 has the characteristics of transmitting the light (the yellow component light Ye and the cyan component light Cy) in yellow Ye and Cyan Cy light wave bands, and reflecting the light (the red component light R, the green component light G, and the blue component light B) in other wavelength bands.

The second band-pass filter 50 serves as a combining unit configured to combine the reference color component light of the multiple colors and the supplemental color component lights in such a way as to superimpose the supplemental color component light on the light paths of the reference color component light of the multiple colors.

Referring back to FIG. 1, the rod integrator 60 has a light incident surface, a light emission surface, and a light reflection side surface extending from the periphery of the light incident surface to the periphery of the light emission surface. The rod integrator 60 uniformize the color component light obtained by the combining in the band-pass filter 50. Specifically, the rod integrator 60 uniformize the color component light by reflecting the color component light on the light reflection side surface. The rod integrator 60 may be a solid rod made of glass and the like or a hollow rod having a mirror inner surface.

The MAD 80 includes multiple movable micromirrors each corresponding to a single pixel. The DMD 80 changes the angle of the micromirrors to reflect or not to reflect light toward the projection unit 90.

The projection unit 90 projects light (image light) emitted from the rod integrator 60 onto a projection surface.

In the first embodiment, it should be noted that the light source device is formed of the reference light source 10, the excitation light source 20, the reflection-type wheel 40, and the second band-pass filter 50. The light source device may further include the first band-pass filter 30 or the rod integrator 60.

(Supplemental Color Component Light Superimposition)

Figure 5:
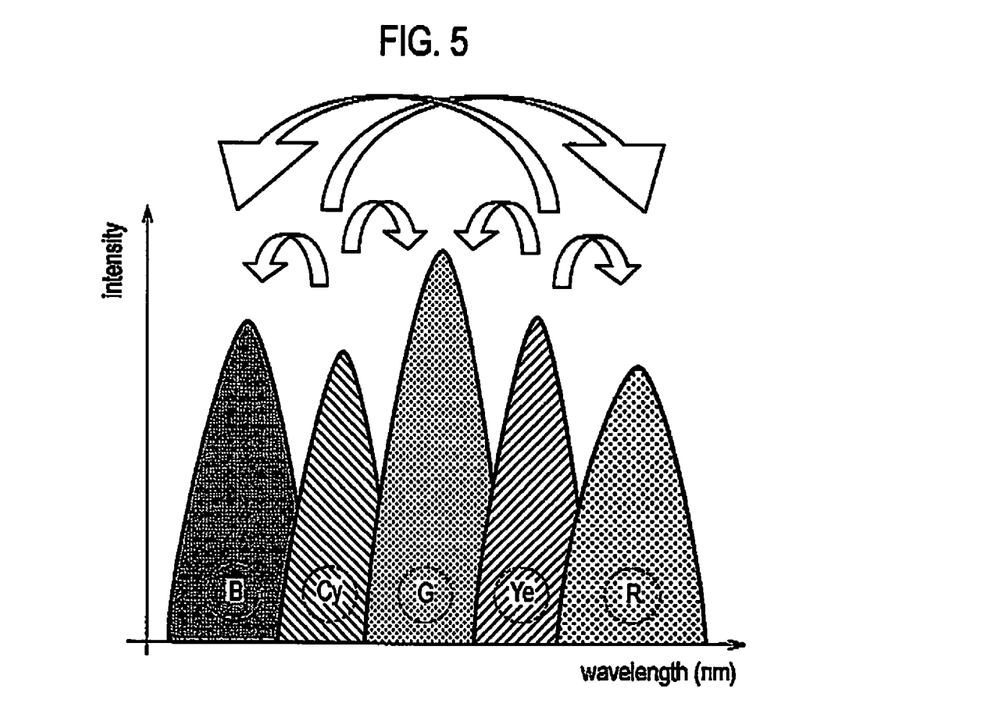
FIG. 5 is a diagram for explaining superposition of supplemental color component light according to the first embodiment.
Figure 6:
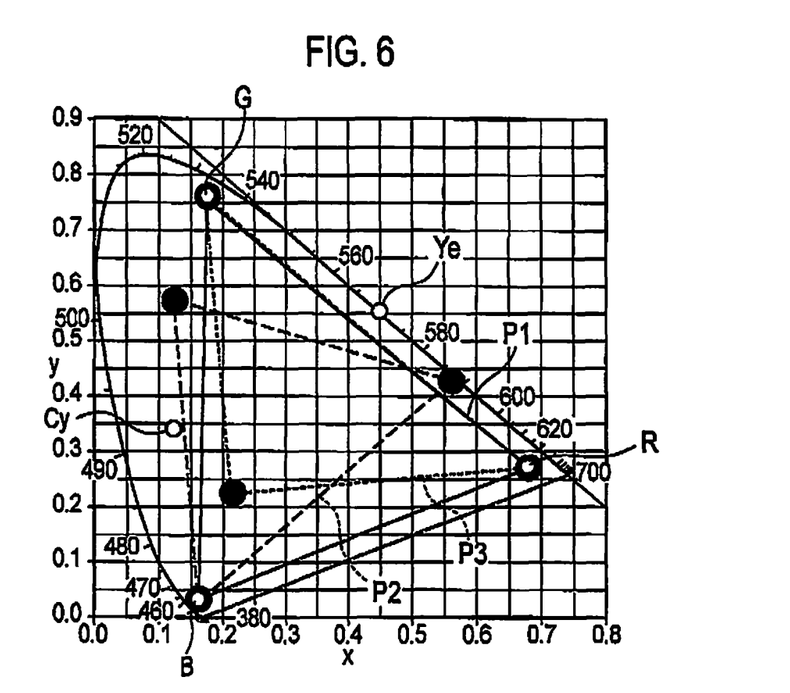
FIG. 6 is a diagram showing a color reproduction range according to the first embodiment.
Figure 7:
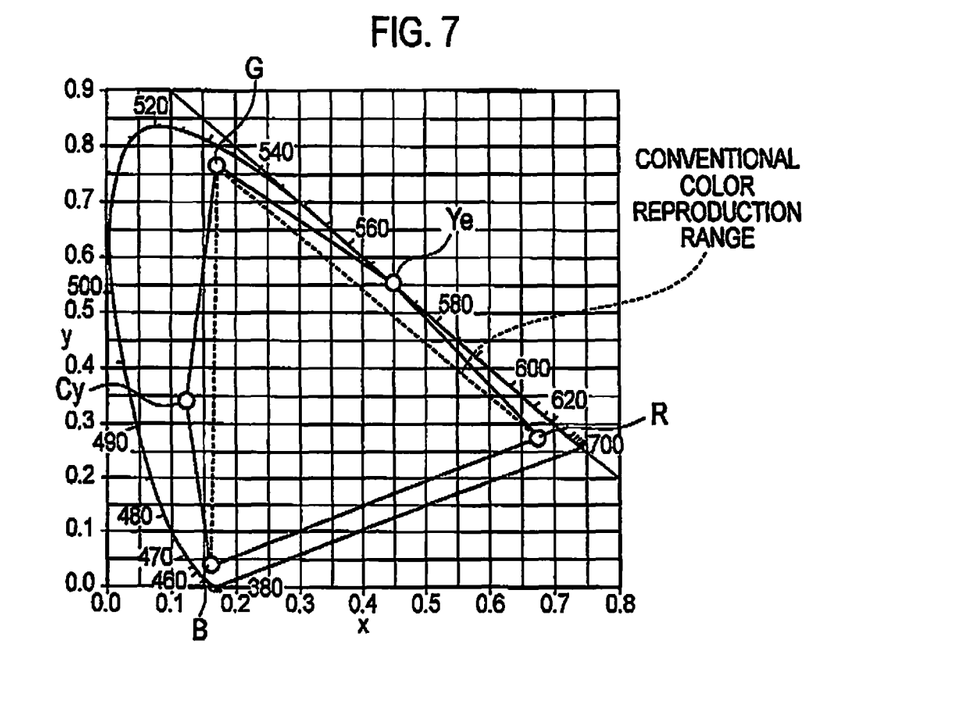
FIG. 7 is a diagram showing the color reproduction range according to the first embodiment.

Supplemental color component light superimposition according to the first embodiment is described below with reference to the drawings. FIG. 5 to FIG. 7 are diagrams for explaining the supplemental color component light superimposition according to the first embodiment. In the first embodiment, the description is given for a case where the yellow component light Ye and the cyan component light Cy are the supplemental color component light, and the red component light R, the green component light G, and the blue component light B are the reference color component light.

As shown in FIG. 5, the yellow component light Ye is in the wavelength band between those of the red component light R and the green component light G. The yellow component light Ye is superimposed on any one of the red component light R, the green component light G, and the blue component light B. The cyan component light Cy is in the wavelength band between those of the green component light G and the blue component light B. The cyan component light Cy is superimposed on any one of the red component light R, the green component light G, and the blue component light B.

Next, the color reproduction range is exemplarily described with reference to FIG. 6. Color reproduction range $P_1$ in FIG. 6 is obtained when no reference color component light (the red component light R, the green component light G, and the blue component light B) is subjected to the supplemental color component light superimposition. Color reproduction range $P_2$ is obtained when no supplemental color component light is superimposed on the blue component light B, the yellow component light Ye is superimposed on the red component light R, and the cyan component light Cy is superimposed on the green component light G. Color reproduction range $P_3$ is obtained when no supplemental color component light is superimposed on the red component light R and the green component light G, and the yellow component light Ye and the cyan component light Cy are superimposed on the blue component light B.

As shown in FIG. 6, the color reproduction range can be changed by the supplemental color component light (the yellow component light Ye and the cyan component light Cy) superimposition.

As shown in FIG. 7, the color reproduction range can be widened compared to the conventional case by selectively superimposing the supplemental color component light (the yellow component light Ye and the cyan component light Cy) on the reference color component light (the red component light R, the green component light G and the blue component light B).

(Configuration of Control Unit)

Figure 8:
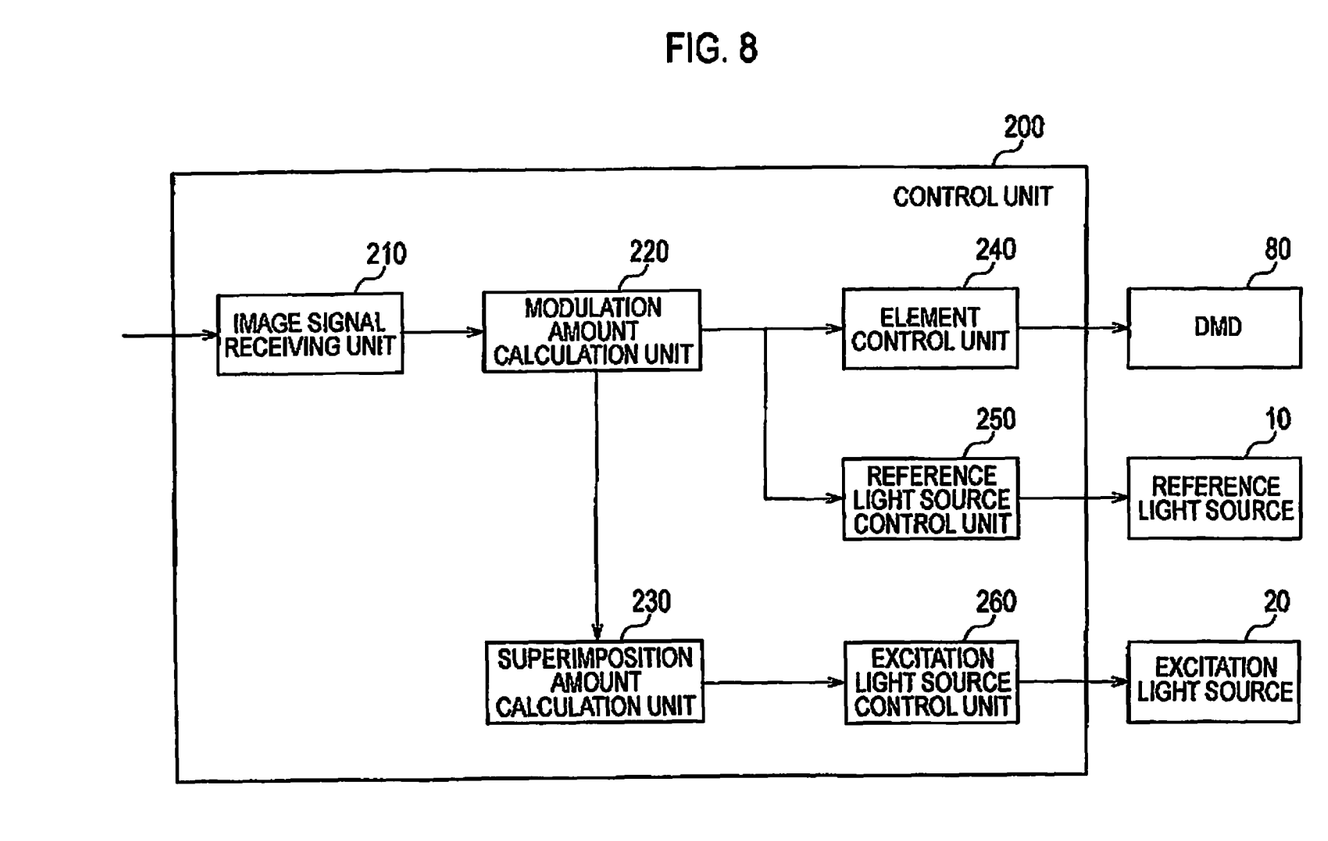
FIG. 8 is a block diagram of a control unit 200 according to the first embodiment.

The control unit according to the first embodiment is described below with reference to the drawings. FIG. 8 is a block diagram of the control unit 200 according to the first embodiment. The projection display apparatus 100 is provided with and controlled by the control unit 200.

The control unit 200 converts an image input signal into an image output signal. The image input signal includes a red input signal $R_{in}$, a green input signal $G_{in}$, and a blue input signal $B_{in}$. The image output signal includes a red output signal $R_{out}$, a green output signal $G_{out}$, and a blue output signal $B_{out}$. The image input signal and the image output signal are input for every pixels of a single frame.

As shown in FIG. 8, the control unit 200 includes an image signal receiving unit 210, a modulation amount calculation unit 220, a superimposition amount calculation unit 230, an element control unit 240, a reference light source control unit 250, and an excitation light source control unit 260.

The image signal receiving unit 210 receives an image input signal from an external device (not shown) such as a DVD player and a TV tuner.

The modulation amount calculation unit 220 converts the image input signal into an image output signal. The image output signal, which indicates the light modulation amount, is used to control the DMD 80.

The modulation amount calculation unit 220 may convert the image input signal into the image output signal based on the superimposed amount of the supplemental color component light. For example, the modulation amount calculation unit 220 may add or subtract the red input signal $R_{in}$, the green input signal $G_{in}$, and the blue input signal $B_{in}$ based on the superimposition amount of the supplemental color component light.

The superimposition amount calculation unit 230 calculates the superimposition amount of the supplemental color component light based on the image input signal. The modulation amount calculation unit 220 also determines reference color component light (the red component light R, the green component light G, and the blue component light B) on which the supplemental color component light should be superimposed. In other words, the modulation amount calculation unit 220 determines the timing at which the supplemental color component light should be superimposed.

The element control unit 240 controls the DMD 80 based on the image output signal. Specifically, the element control unit 240 controls the angle of the micromirrors provided to the DMD 80.

The reference light source control unit 250 controls the reference light sources 10 (the light source 10R, the light source 10G, and the light source 10B). A single image is formed of light projected by the projection unit 90 in a single frame period. A single frame period includes a red emission segment R (segment R), a green emission segment G (segment G), and a blue emission segment B (segment B).

Specifically, in the red emission segment R, the reference light control unit 250 controls the light source 10R so that the red component light R is emitted. Similarly, in the green emission segment G, the reference light control unit 250 controls the light source 10G so that the green component light G is emitted, and in the blue emission segment B, the reference light control unit 250 controls the light source 10B so that the blue component light B is emitted.

The excitation light source control unit 260 controls the excitation light source 20. Specifically, the excitation light source control unit 260 controls the amount of excitation light X emitted from the excitation light source 20 based on the supplemental color component light superimposition amount calculated by the superimposition amount calculation unit 230. The excitation light source control unit 260 controls the timing at which the excitation light X is emitted from the excitation light source 20 based on the timing at which the supplemental color component light should be superimposed determined by the superposition calculation unit 230.

It should be noted that the timing at which the excitation light X is emitted from the excitation light source 20 is synchronized with the rotation of the reflection-type wheel 40.
(Supplemental Color Component Light Superimposition Timing)

Figure 9:
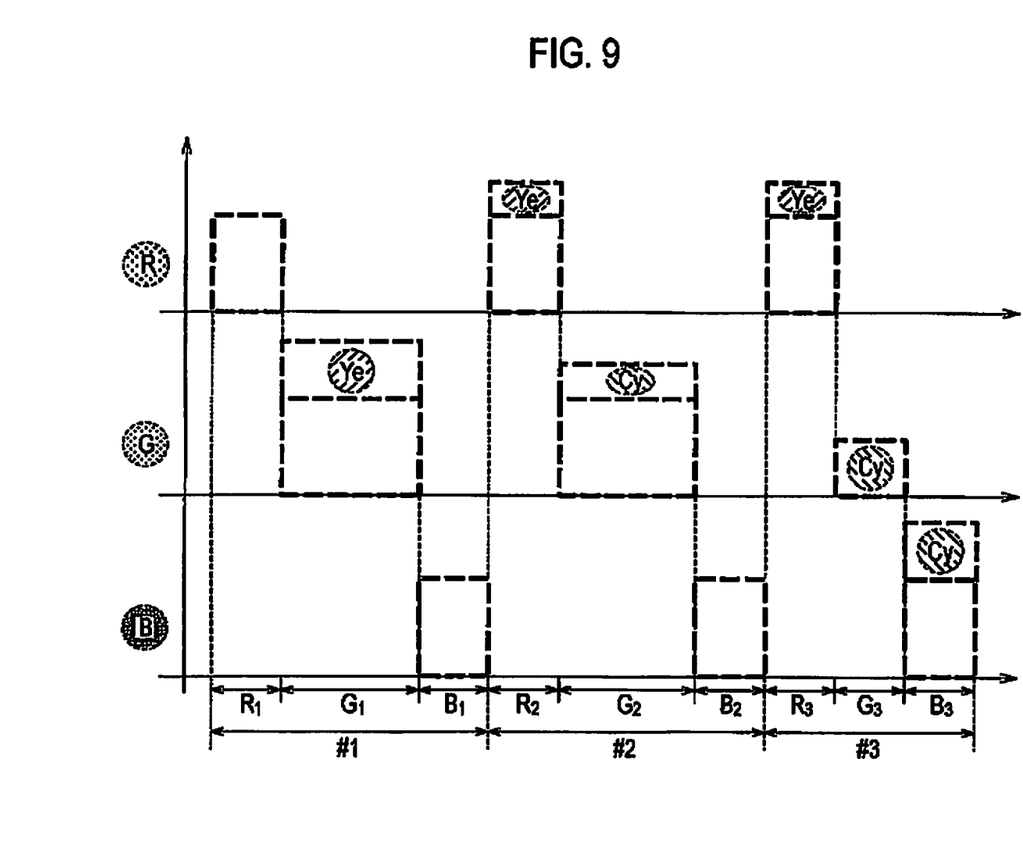
FIG. 9 is a timing chart of supplemental color component light superposition according to the first embodiment.

The supplemental color component light superimposition timing according to the first embodiment is described with reference to one of the drawings. FIG. 9 is a timing chart of the supplemental color component light superimposition timing according to the first embodiment.

As shown in FIG. 9, the single frame period includes the red emission segment R, the green emission segment G, and the blue emission segment B. In FIG. 9, frame period #1 to frame period #3 are exemplarily shown.

For example, in the frame period #1, the yellow component light Ye is superimposed on the green component light G. Accordingly, the excitation light source control unit 260 controls the excitation light source 20 so that the excitation light X is emitted during the green emission segment $G_1$.

More specifically, in the green emission segment $G_1$, the excitation light source control unit 260 controls the excitation light source 20 so that the excitation light X is emitted at a timing at which the excitation light X is incident on the luminous body region 41Ye but not on the luminous body region 41Cy. Naturally, the revolution period of the reflection-type wheel 40 is at least shorter than the single frame period.

In the frame period #2, the yellow component light Ye is superimposed on the red component light R and the cyan component light Cy is superimposed on the green component light G. Thus, during the red emission segment $R_2$, the excitation light source control unit 260 controls the excitation light source 20 so that the excitation light X is emitted at a timing at which the excitation light X is incident on the luminous body region 41Ye but not on the luminous body region 41Cy. In the green emission segment $G_2$, the excitation light source control unit 260 controls the excitation light source 20 so that the excitation light X is emitted at a timing at which the excitation light X is incident on the luminous body region 41Cy but not on the luminous body region 41Ye.

In the frame period #3, the yellow component light Ye is superimposed on the red component light R and the cyan component light Cy is superimposed on the green component light G and the blue component light B. Thus, during the red emission segment $R_3$, the excitation light source control unit 260 controls the excitation light source 20 so that the excitation light X is emitted at a timing at which the excitation light X is incident on the luminous body region 41Ye but not on the luminous body region 41Cy. In the green emission segment $G_3$ and the blue emission segment $B_3$, the excitation light source control unit 260 controls the excitation light source 20 so that the excitation light X is emitted at a timing at which the excitation light X is incident on the luminous body region 41Cy but not on the luminous body region 41Ye.
(Advantageous Effects)

In the embodiment, the second band-pass filter 50 combines the reference color component light of the multiple colors and the supplemental color component light in such a way as to superimpose the supplemental color component light on the light paths of the reference color component light of the multiple colors. The supplemental color component light is emitted from the luminous body in response to the excitation light emitted from the excitation light source.

Thus, the supplemental color component light can be selectively superimposed on the reference color component light of the multiple colors, whereby the color reproduction range can be appropriately improved.
[First Modification]

A first modification of the first embodiment is described below with reference to the drawings. The difference from the first embodiment is mainly described below.

Figure 10:
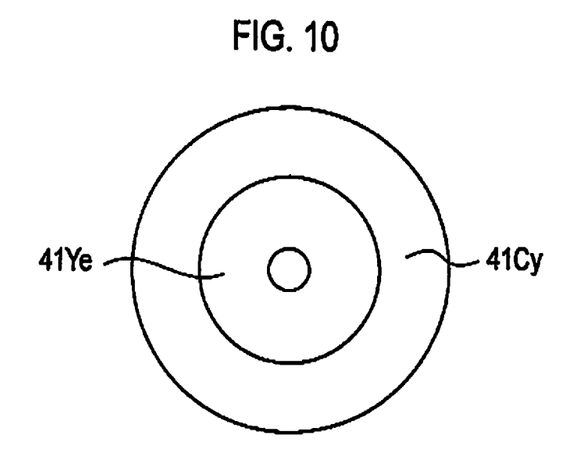
FIG. 10 is a diagram of a reflection type wheel 40 according to a first modification.

In the first embodiment, the luminous body region 41Cy and the luminous body region 41Ye provided to the reflection-type wheel 40 each have a substantially semicircular shape. In contrast, in the first modification, the luminous body region 41Cy and the luminous body region 41Ye provided to the reflection-type wheel 40 each have a ring shape as shown in FIG. 10.

Figure 11:
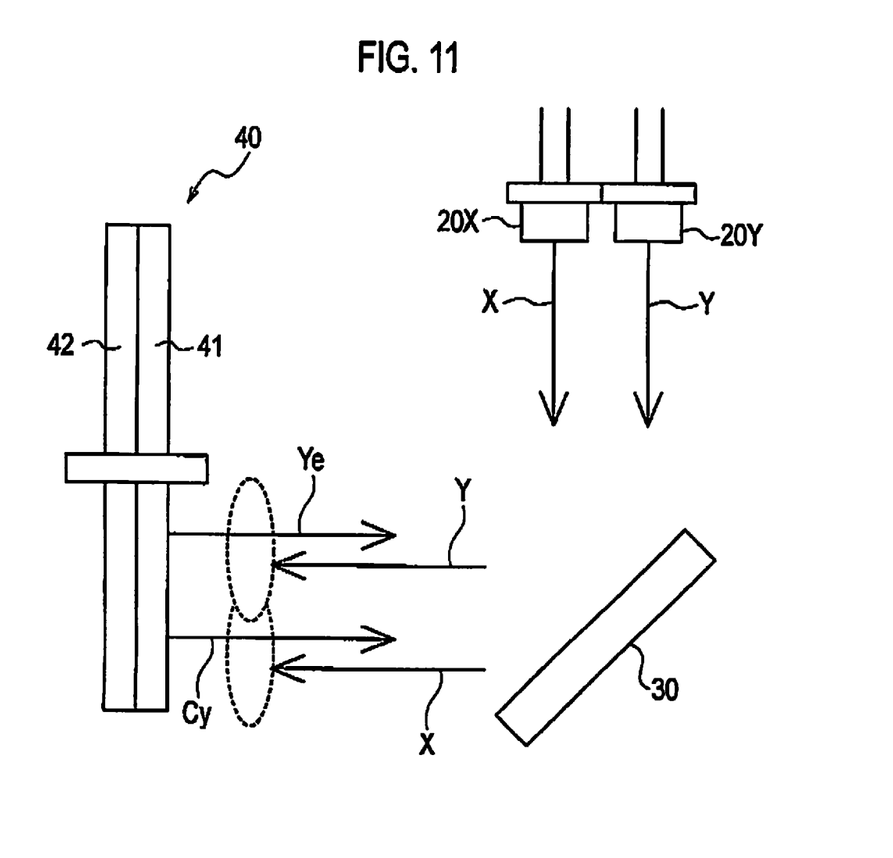
FIG. 11 is a diagram of the reflection type wheel 40 according to the first modification.

Here, the projection display apparatus 100 has multiple excitation light sources 20 (an excitation light source 20x and an excitation light source 20Y) as shown in FIG. 11.

The excitation light source 20X emits excitation light X for the yellow component light Ye. The excitation light X is reflected by the first band-pass filter 30 to be applied on the luminous body region 41Ye.

The excitation light source 20Y emits excitation light Y for the cyan component light Cy. The excitation light Y is reflected by the first band-pass filter 30 to be applied on the luminous body region 41Cy.
(Advantageous Effect)

In the first modification, the light source for emitting the excitation light X for the yellow component light Ye and the light source for emitting the excitation light Y for the cyan component light Cy are separately provided. Thus, the timing at which the excitation light X (or the excitation light Y) is emitted from the excitation light source 20 does not have to be synchronized with the rotation of the reflection-type wheel 40, whereby the excitation light source 20 can be easily controlled.
[Second Modification]

A second modification of the first embodiment is described below with reference to the drawings. The difference from the first embodiment is mainly described below.

Figure 12:
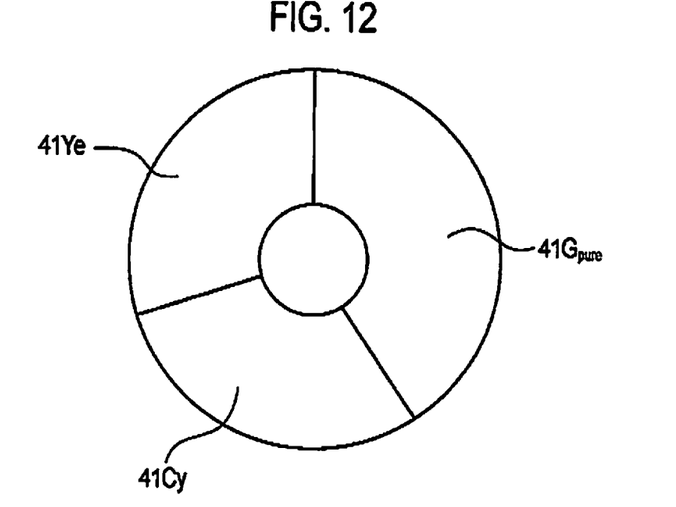
FIG. 12 is a diagram of the reflection type wheel 40 according to a second modification.

In the first embodiment, the reflection-type wheel 40 includes the luminous body region 41Cy and the luminous body region 41Ye. In contrast, in the second modification, the reflection-type wheel 40 includes a luminous body region $41G_{pure}$ in addition to the luminous body region 41Cy and the luminous body region 41Ye as shown in FIG. 12. The luminous body region $41G_{pure}$ includes a luminous body that emits pure green component light Gpure in response to the excitation light X. The pure green component light Gpure has a wavelength band shorter than that of the green component light G.

Figure 13:
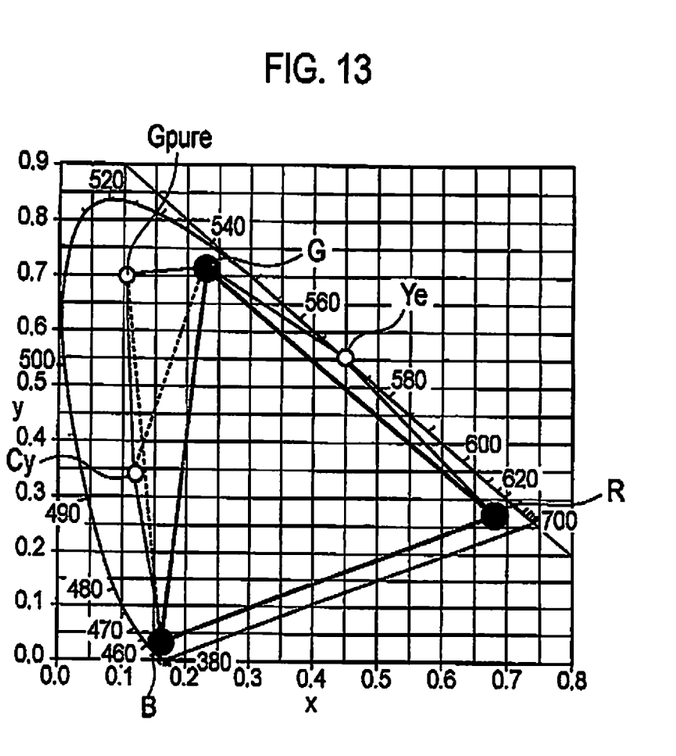
FIG. 13 is a diagram showing a color reproduction range according to the second modification.

The color reproduction range can be further widened, as shown in FIG. 13, by using the pure green component light Gpure as the supplemental color component light in addition to the cyan component light Cy and the yellow component light Ye.

[Third Modification]

A third modification of the first embodiment is described below with reference to the drawings. The difference from the first embodiment is mainly described below.

Figure 14:
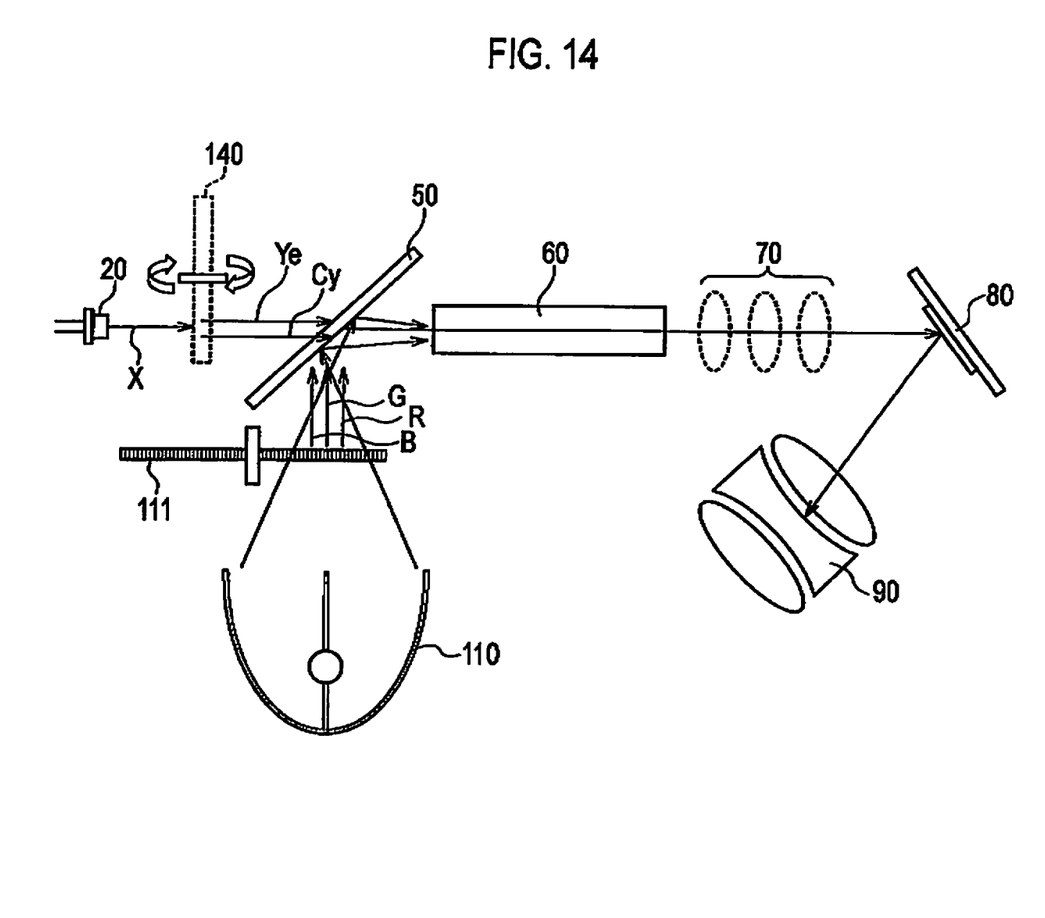
FIG. 14 is a diagram of the projection display apparatus 100 according to a third modification.

Firstly, in the third modification, a reference light source 110 and a color wheel 111 are provided instead of the reference light sources 10 (the light source 10R, the light source 10G, and the light source 10B), the dichroic mirror 11, and the dichroic mirror 12 as shown in FIG. 14.

The reference light source 110 is a white light source that emits white light including the red component light R, the green component light G, and the blue component light B. The reference light source 110 is a UHP lamp or a xenon lamp, for example.

The color wheel 111 is configured to rotate about a rotation axis. The color wheel 111 includes a red transmission area, a green transmission area and a blue transmission area. Here, the light emitted from the reference light source 110 passes through the red transmission area in the red emission segment R. Similarly, the light emitted from the reference light source 110 passes through the green transmission area in the green emission segment G and the light emitted from the reference light source 110 passes through the blue transmission area in the blue emission segment B.

Secondly, in the third modification, a transmission-type wheel 140 is provided instead of the reflection-type wheel 40 as shown in FIG. 14.

The transmission-type wheel 140 is configured to rotate about the rotation axis like the reflection-type wheel 40. The transmission-type wheel 140 includes a layer (corresponding to the luminous body layer 41 for the reflection-type wheel 40) provided with a luminous body that emits supplemental color component light in response to the excitation light X. Naturally, the transmission-type wheel 140 requires no layer corresponding to the reflective film 42 for the reflection-type wheel 40.

Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment, the DMD 80 is exemplified as an imager. However, the embodiment is not limited to this, and three liquid crystal panels (a red liquid crystal panel, a green liquid crystal panel, and a blue liquid crystal panel) may serve as the imager.

In the embodiment, the excitation light source 20 emits excitation light in any one of the segments (the red emission segment R, the green emission segment G, and the blue emission segment B) forming a single frame. However, the embodiment is not limited thereto. Specifically, the excitation light source 20 naturally emits no excitation light in any of the segments if no supplemental color component light is superimposed on the reference color component light.

What is claimed is:

1. A light source device comprising:
a reference light source that emits reference color component light of a plurality of colors;
an excitation light source that emits an excitation light for a supplemental color component light;
a luminous body member including a luminous body that emits the supplemental color component light in response to the excitation light, the luminous body member including a plurality of supplementary color emission regions configured to emit different supplementary colors upon exposure to the excitation light; and
a combining unit that combines the reference color component light of the plurality colors and the supplemental color component light in such a way as to superimpose the supplemental color component light on light paths of the reference color component light of the plurality of colors.

2. The light source device according to claim 1, wherein
the reference color light source sequentially emits the reference color component light of the plurality of colors respectively in a plurality of first time segments forming a single frame,
the excitation light source emits the excitation light in a color emission time segment that is at least one of the plurality of first time segments, and
the supplemental color component light is superimposed on any one of the reference color component light of the plurality of colors in the color emission time segment.

3. The light source device according to claim 1, wherein the luminous body is a reflection-type wheel.

4. The light source device according to claim 1, wherein the combining unit is a band-pass filter that reflects the reference color component light of the plurality of colors and transmits the supplemental color component light.

5. A projection display apparatus comprising:
a reference light source that emits reference color component light of a plurality of colors;
an excitation light source that emits an excitation light for a supplemental color component light;
a luminous body member including a luminous body that emits the supplemental color component light in response to the excitation light, the luminous body member including a plurality of supplementary color emission regions configured to emit different supplementary colors upon exposure to the excitation light;
a combining unit that combines the reference color component light of the plurality colors and the supplemental color component light in such a way as to superimpose the supplemental color component light on light paths of the reference color component light of the plurality of colors; and
an imager that modulates light emitted from the combining unit.

6. The light source device according to claim 1, wherein the luminous body includes a luminous body layer and a reflective film.

7. The light source device according to claim 4, wherein the luminous body includes a luminous body layer and a reflective film.

* * * * *

UNITED STATES PATENT AND TRADEMARK OFFICE
CERTIFICATE OF CORRECTION

PATENT NO. : 8,469,520 B2
APPLICATION NO. : 13/118965
DATED : June 25, 2013
INVENTOR(S) : Makoto Maeda Page 1 of 1

It is certified that error appears in the above-identified patent and that said Letters Patent is hereby corrected as shown below:

On Title page, in column 1, Item (73) for "Assignee", line 1, delete "Sanyo Electric., Ltd." and insert --SANYO ELECTRIC CO., LTD.--, therefor.

Signed and Sealed this
Twelfth Day of November, 2013

Teresa Stanek Rea
*Deputy Director of the United States Patent and Trademark Office*